US007168622B2

(12) United States Patent
Chen

(10) Patent No.: US 7,168,622 B2
(45) Date of Patent: Jan. 30, 2007

(54) CARD EDGE CONNECTOR

(75) Inventor: Wan-Tien Chen, Taipei (TW)

(73) Assignee: Egbon Electronics Ltd., Taipei (TW)

( * ) Notice: Subject to any disclaimer, the term of this patent is extended or adjusted under 35 U.S.C. 154(b) by 0 days.

(21) Appl. No.: 11/182,224

(22) Filed: Jul. 15, 2005

(65) Prior Publication Data

US 2006/0172605 A1 Aug. 3, 2006

(30) Foreign Application Priority Data

Feb. 3, 2005 (TW) .............................. 94202001 U

(51) Int. Cl.
*G06K 7/00* (2006.01)
*G06K 13/06* (2006.01)

(52) U.S. Cl. ....................................... 235/486; 235/483

(58) Field of Classification Search ................ 235/483, 235/486, 492
See application file for complete search history.

(56) References Cited

U.S. PATENT DOCUMENTS 5,483,422 A * 1/1996 Bowen et al. .............. 361/802
6,145,747 A * 11/2000 Wu ............................ 235/486
6,644,550 B1 * 11/2003 Pickles ....................... 235/486
2002/0053599 A1 * 5/2002 Gerrits et al. ............... 235/492
2003/0114031 A1 * 6/2003 Hu et al. .................... 439/159

* cited by examiner

*Primary Examiner*—Thien M. Le
*Assistant Examiner*—April A. Taylor
(74) *Attorney, Agent, or Firm*—J.C. Patents

(57) ABSTRACT

A card edge connector is provided to accommodate an electric card and electrically connects the electric card with a motherboard. In the card edge connector, an insulating housing and a pair of latch assemblies are disposed at two opposite ends of the housing. A fixed metal element and a movable metal element in the latch assembly are disposed on two neighboring side surfaces. Each of the fixed metal element and the movable metal element has a stopper and a correspondingly extension. When the supporting beams are stretched outwardly to insert the electronic card, the stoppers restrain the movement of the extension parts to prevent the free end of the supporting beams from being over moved.

9 Claims, 9 Drawing Sheets

CARD EDGE CONNECTOR

CROSS-REFERENCE TO RELATED APPLICATION

This application claims the priority benefit of Taiwan application serial no. 94202001, filed on Feb. 3, 2005. All disclosure of the Taiwan application is incorporated herein by reference.

BACKGROUND OF THE INVENTION

1. Field of the Invention

The present invention relates to a connector, and more particularly to a card edge connector with latches comprising two metal elements on two sides of the plastic-formed supporting beams so as to secure an electronic card.

2. Description of the Related Art

Card edge connectors have been widely used in notebooks or other electronic apparatuses. One of the card edge connectors accommodates an electronic card, such as a memory module, to electrically connect with a motherboard. The card edge connector generally comprises a plastic housing and two side beams extended from two ends thereof. One end of the electronic card is inserted in the card edge connector. Through the connection of terminals of the electronic card and terminals of the plastic housing, the electronic card electrically connects with the motherboard. These two side beams hold two opposite end edges of the electronic card respectively. Through lock portions of the side beams, the electronic card is locked and fixed, and the issue of disassembling the electronic card resulting from outside vibration is avoided. In addition, the electrical disconnection of the electronic card and the motherboard can be prevented.

For a conventional card edge connector, its two side beams are stamped from a single metal plate and are fixed on the plastic housing. The metal plate, however, generates the metal shielding effect. As a result, the side beams formed of the metal plate will affect the normal operation of the devices on the electronic card. Moreover, since each of the side beams is an independent element, a relatively complicated locker structure should be formed at the place corresponding to each of the side beams to fix to the electronic card. Accordingly, the structure not only increases the complexity of fabricating the metal elements, but also raises the manufacturing costs.

Accordingly, another card edge connector was developed. The card edge connector comprises a plastic housing and latch assemblies on its two ends. Each of the latch assemblies comprises an elastic plastic element and an elastic metal element. The elastic plastic element is formed on the plastic housing by a one-piece process. By the assembly of the elastic plastic element and the elastic metal element, the metal shielding effect caused by the metal side beams described above can be reduced. While the card edge connector is used, the elastic plastic element collides with the elastic metal element. Because the structure strength of the elastic plastic element is not strong enough, the elastic plastic element will be distorted after several uses. Finally, fractures occur at the joint of the elastic plastic element and the plastic housing, and the whole card edge connector cannot be used anymore. Moreover, since the latch structure of the metal element is very complicated and the metal element is formed by a one-piece process, the structure not only increases the complexity of fabricating the latch assembly but also raises the costs of molds.

Therefore, how to fabricate a card edge connector with a simple structure, high structure strength, and low costs is an issue to be solved.

SUMMARY OF THE INVENTION

Accordingly, the present invention is directed to a solution of the conventional technology, which causes high difficulty of process and high manufacturing costs resulting from the complexity of the latch structure of the metal element.

The present invention also is directed to a card edge connector to accommodate an electronic card. The electronic card electrically connects with the motherboard through the card edge connector.

In order to achieve the objects described above, the present invention provides a card edge connector adapted to electrically connect an electronic card with a motherboard. The card edge connector comprises an insulating housing, a plurality of conductive terminals and a pair of latch assemblies. The insulating housing comprises an elongated base and a pair of connection portions disposed along two sides of the elongated base. The elongated base comprises a slot along a longitudinal direction of the elongated base. The conductive terminals are disposed over the elongated base and extend into the slot so as to connect with the electronic card inserted in the slot. The pair of latch assemblies is individually disposed to the connection portions to fix to the electronic card. Each of the latch assemblies comprises a supporting beam, a fixed metal element and a movable metal element. The fixed end of the supporting beam constitutes the connection portion corresponding thereto, and its free end extends outward along a side of the elongated base. The supporting beam comprises a first limit portion and a lock portion. The first limit portion is adapted to accommodate a top surface of the electronic card, and the lock portion is adapted to accommodate a side surface of the electronic card. The fixed metal element is disposed on a side of the supporting beam and comprises a stopper. The movable metal element is disposed on another side of the supporting beam and comprises an extension corresponding to the stopper. The moveable metal element moves along with the free end of the supporting beam. When the supporting beam is stretched outwardly by external force, the stopper restricts the moving distance of the extension.

Accordingly, in the present invention, the conventional complicated and expensive elastic metal element is replaced by two simple metal elements. By the combination of the metal elements and the supporting beam, the electronic card can be held and fixed firmly. Accordingly, the manufacturing barrier of the metal element is reduced by the present invention. The overall manufacturing costs of the card edge connector also are reduced.

The above and other features of the present invention will be better understood from the following detailed description of the preferred embodiments of the invention that is provided in communication with the accompanying drawings.

DESCRIPTION OF SOME EMBODIMENTS

Figure 1:
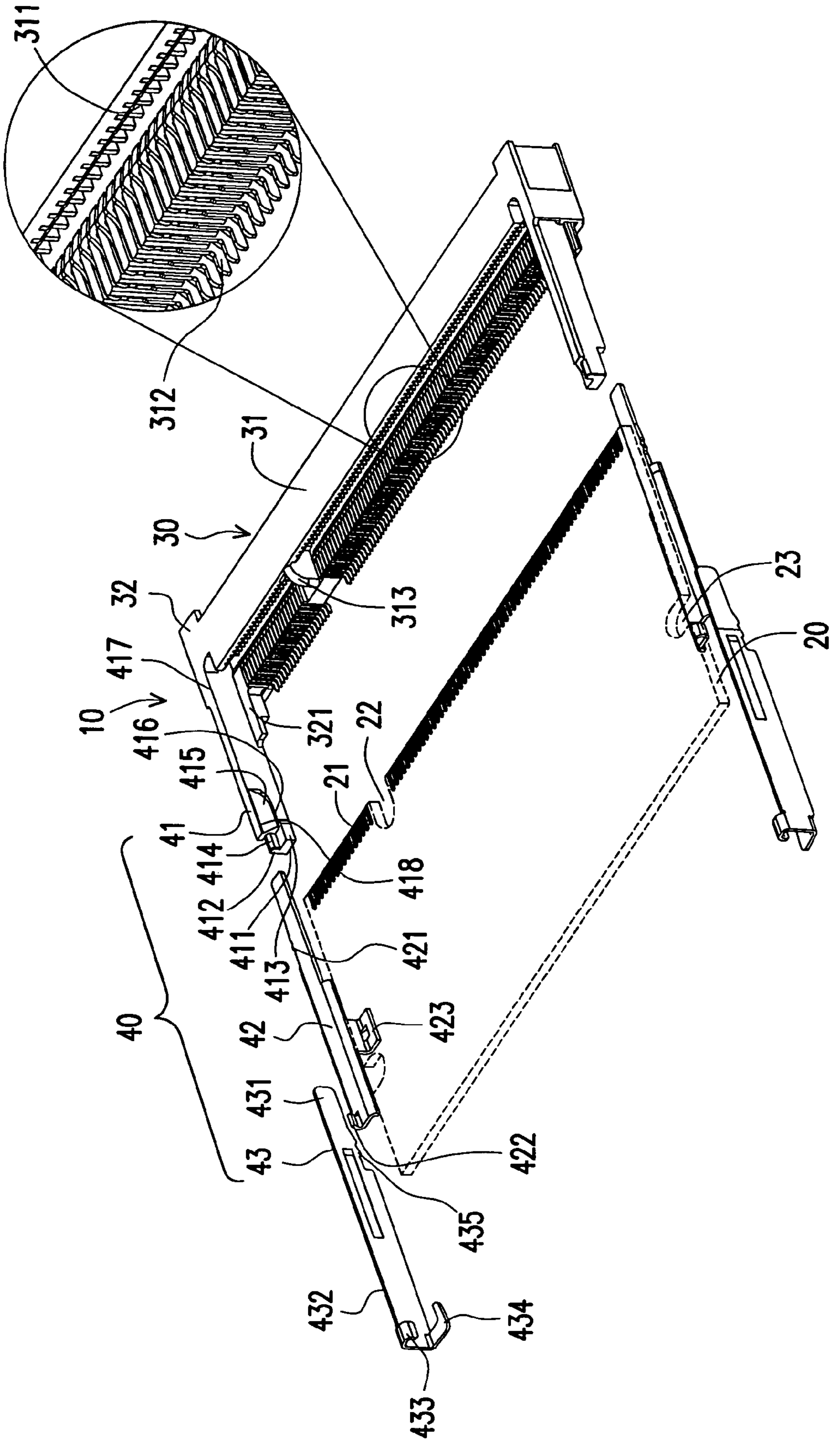
FIG. 1 is a 3D exploded view of a card edge connector according to an embodiment of the present invention.
Figure 2:
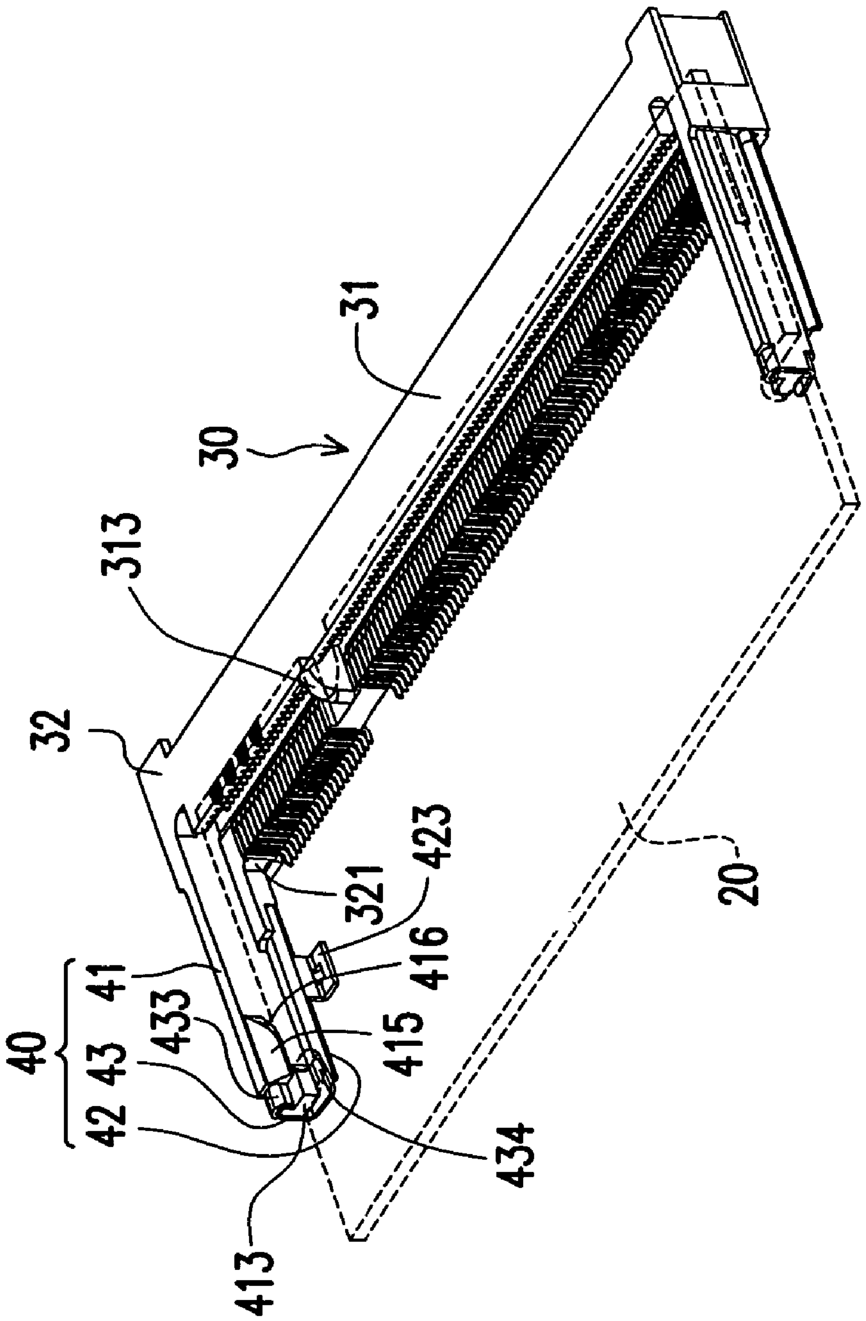
FIG. 2 is a drawing showing a card edge connector according to an embodiment of the present invention.
Figure 3A:
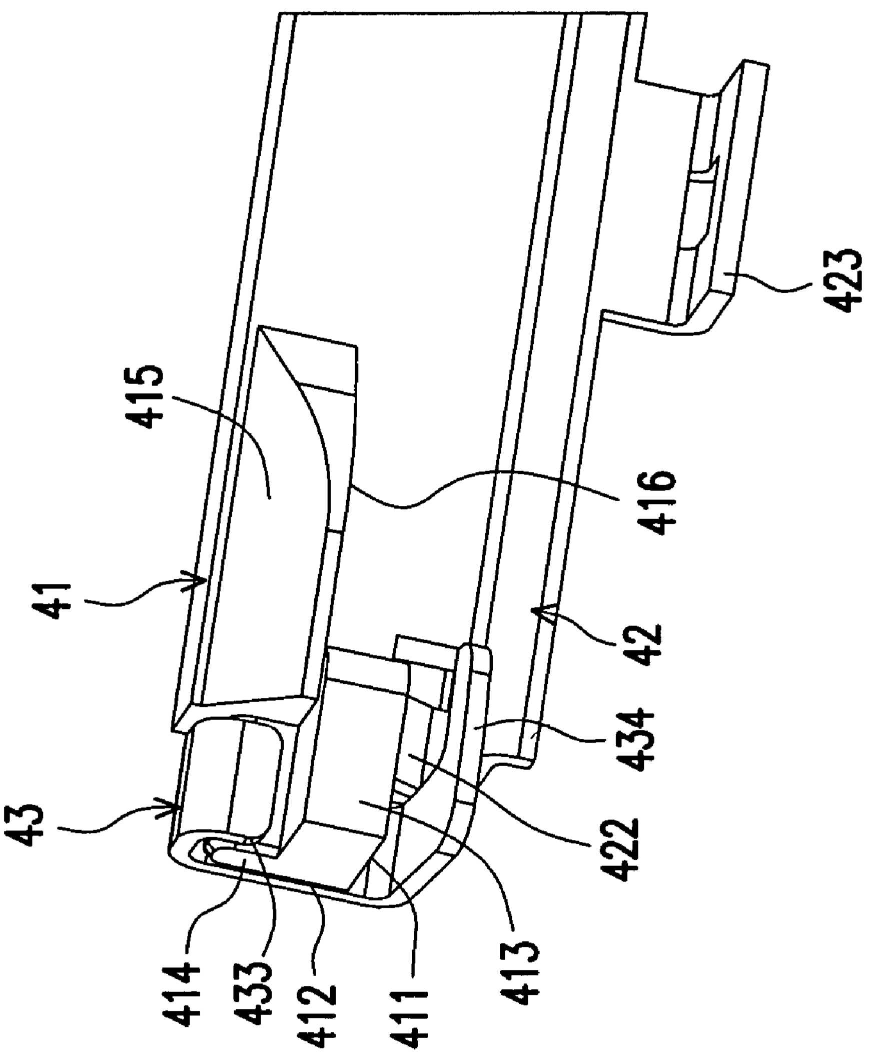
FIGS. 3A–3C are local enlarged drawings of different angle views of a combination of a supporting beam, a fixed metal element and a movable metal element according to an embodiment of the present invention.
Figure 3B:
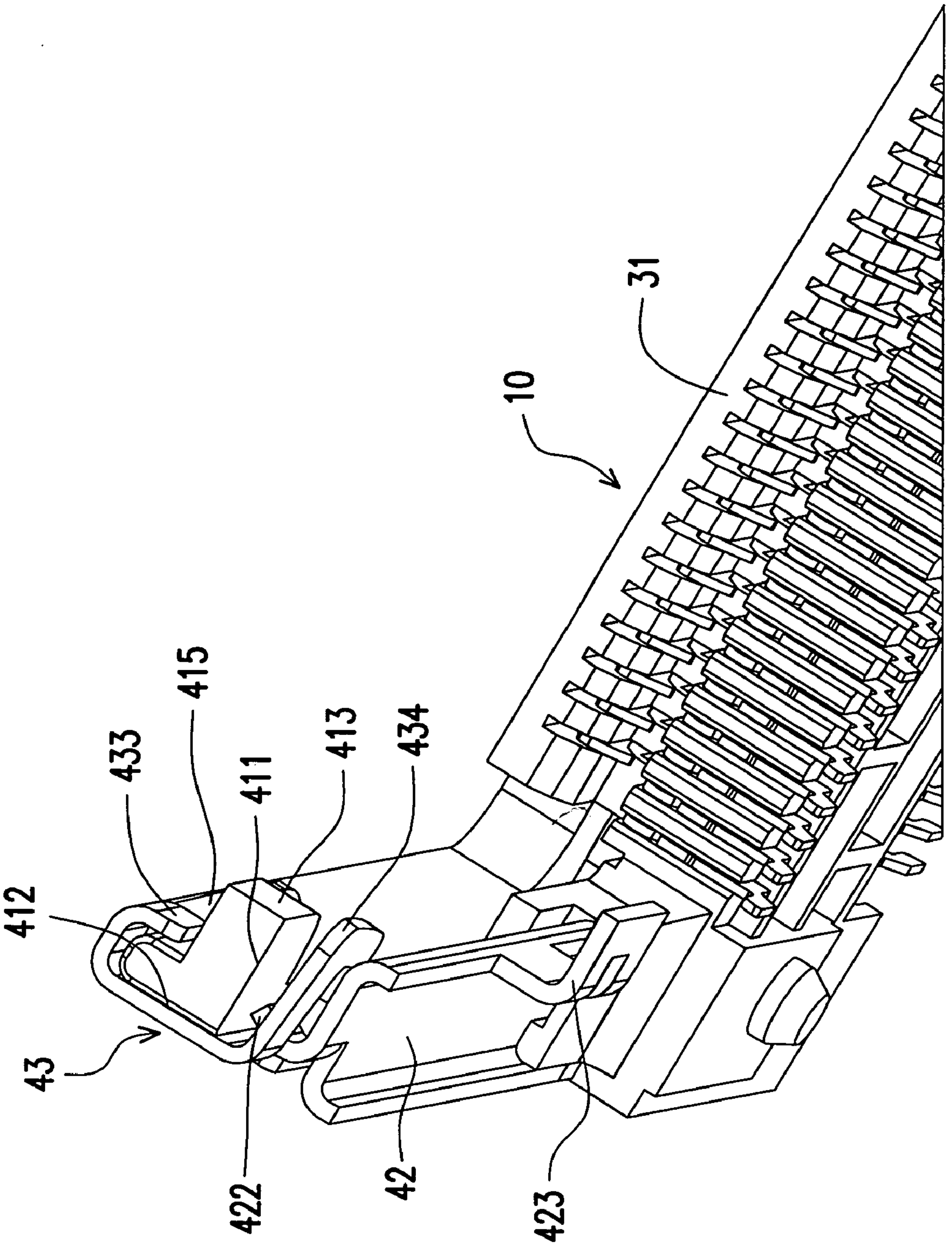
Figure 3C:
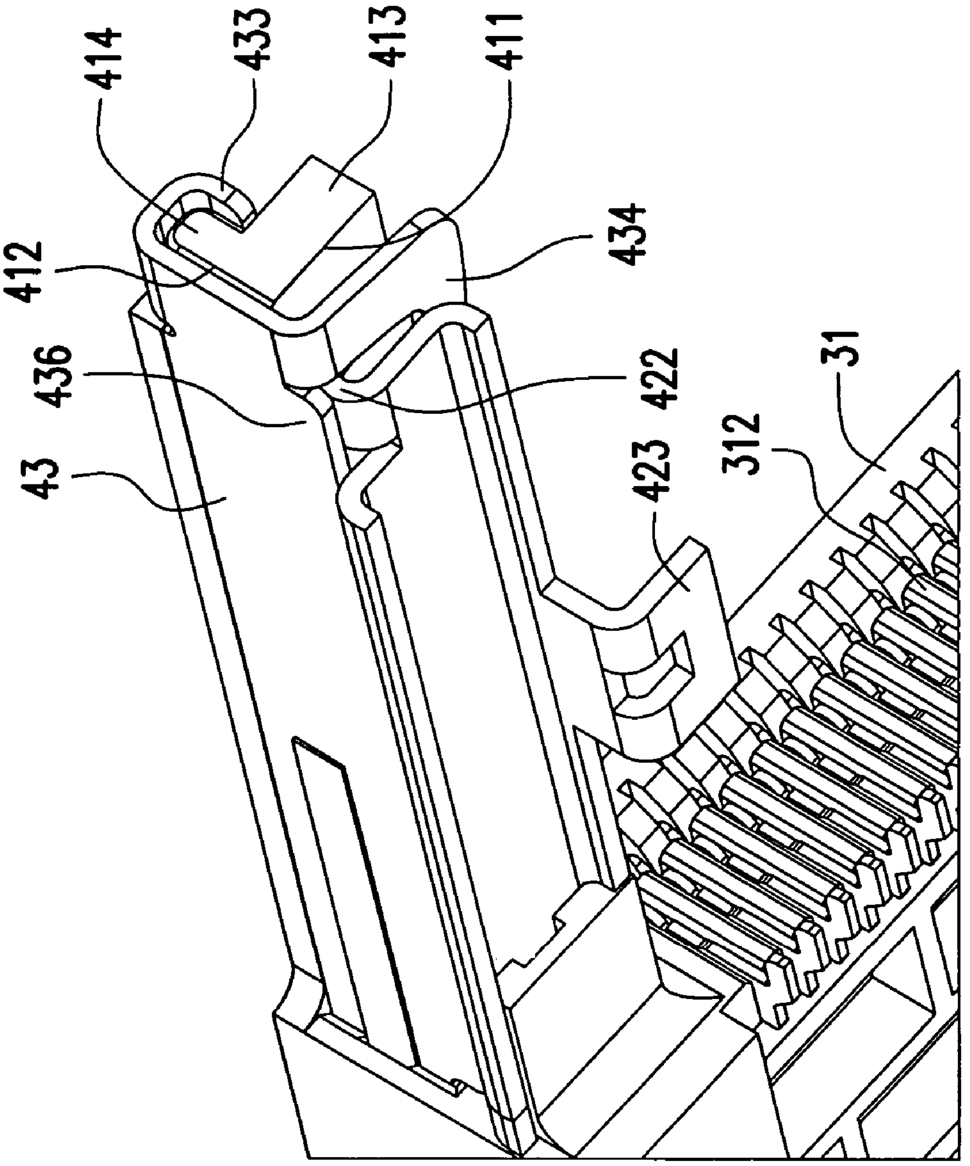
Figure 4:
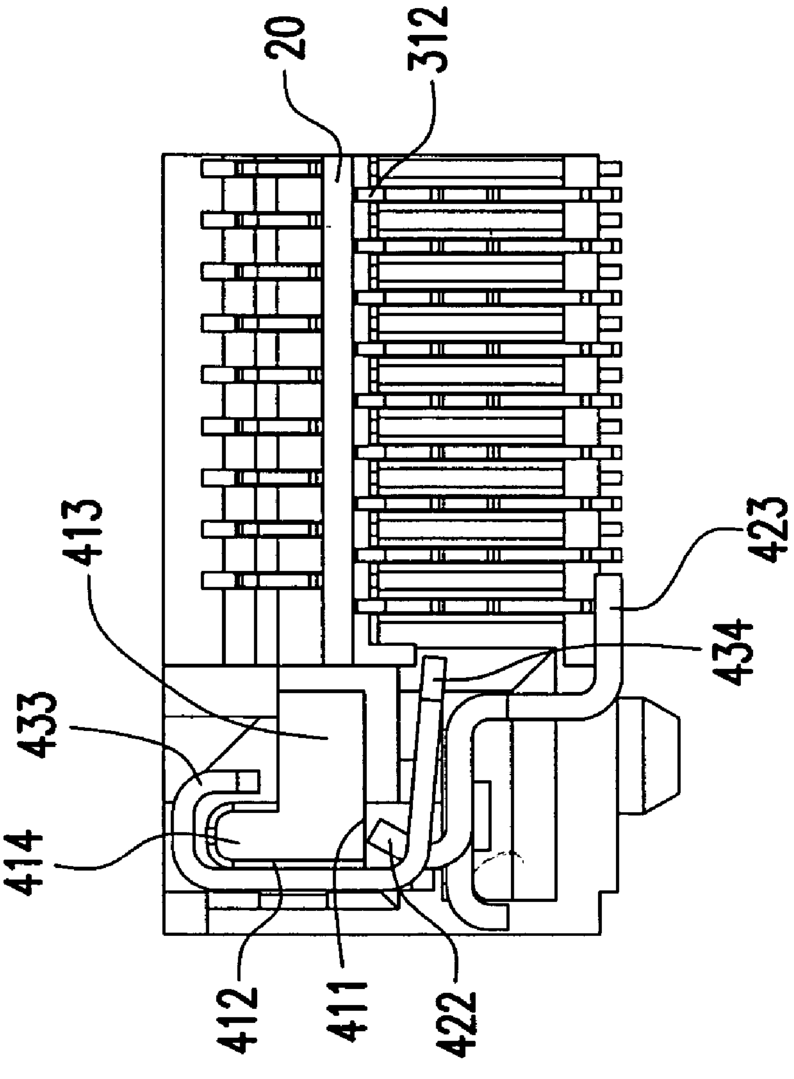
FIG. 4 is a cross sectional view showing a fixed metal element and a movable metal element which are inserted in an elongated base according to an embodiment of the present invention.

A card edge connector 10 of an embodiment of the present invention is disposed over a motherboard (not shown) to fasten and electronically connect an electronic card 20, such as a memory module, with the motherboard.

One side of the electronic card 20 comprises a plurality of contact pads 21. A key slot 22 also is disposed on the side with the contact pads 21. An intrusive locking slot 23 is disposed on each side end adjacent to the contact pads 21.

The card edge connector 10 comprises an insulating housing 30 and a pair of latch assemblies 40. The space constituted by the insulating housing 30 and the latch assemblies 40 is used to accommodate the electronic card 20.

The insulating housing 30 comprises an elongated base 31 and a pair of connection portions 32, wherein the connection portions 32 are disposed on two sides of the elongated base 31 respectively. The insulating housing 30 connects with the pair of the latch assemblies 40 through the connection portions 32 respectively.

The inner side of the elongated base 31 comprises a slot 311 along its longitudinal direction. A plurality of conductive terminals 312 is disposed on the elongated base 31, extending into the slot 311 and connecting with the electronic card 20 inserted in the slot 311. When the electronic card 20 is inserted in the slot 311, the conductive terminals 312 connect with the contact pads 21 of the electronic card 20 so that the electronic card 20 electrically connects with the motherboard through the card edge connector 10. In addition, the inner side of the slot 311 corresponding to the intrusive key slot 22 of the electronic card 20 comprises an extrusive key 313 to prevent the false insertion of the electronic card 20.

To solve the processing difficulty and high manufacturing costs caused by the structure complexity of the conventional elastic metal device, the two latch assemblies 40 disassemble the single elastic metal structure of the conventional technology into two simple metal elements to simplify the structure design of each metal element. By the combination of these two simple metal elements, the function served by the conventional complicated metal element is also achieved. In addition, these two simple metal elements can be easily assembled onto the connection portions 32.

The latch assemblies 40 are disposed at two ends of the elongated base 31 and connect with the connection portions 32 respectively so that the latch assemblies 40 are used to hold and fix to the electronic card 20. Each latch assembly 40 is of the same structure and symmetrical to each other, comprising a supporting beam 41, a fixed metal element 42 and a movable metal element 43.

A fixed end 417 of the supporting beam 41 is disposed at the connection portion 32 corresponding thereto, and a free end 418 of the supporting beam 41 extends outwardly along one side of the elongated base 31. The two supporting beams 41 and the insulating housing 30 are formed of a plastic material by a one-piece process. The supporting beam 41 comprises a first surface 411 and a second surface 412, which are substantially orthogonal to each other; a lock portion 413; a fixed element 414; a slope surface 415; and a first limit portion 416.

The slope surface 415 provides a surface along which the side edge of the electronic card 20 can move downward to stretch the supporting beam 41 and the movable metal element 43 outwardly until the lock portion 413 of the supporting beam 41 locks in the locking slot 23 of the electronic card 20. Accordingly, the electronic card 20 is horizontally fixed. Since the first limit portion 416 at the bottom of the slope surface 415 accommodates the top surface of the electronic card 20, the electronic card 20 is vertically fixed. As a result, the electronic card 20 is fixed on the card edge connector 10.

To prevent the fracture of the fixed end 417 of the supporting beam 41 resulting from bending multiply, a strengthening portion 321 is disposed at the connection portion 32 which is adjacent to the outer side of the fixed end 417 of the supporting beam 41. The strengthening portion 321 enhances the structure strength of the supporting beam 41.

The fixed metal element 42 is fixed on the connection portion 32 and adjacent to one side of the first surface 411 of the supporting beam 41. The fixed metal element 42 comprises a barb 421, a stopper 422 and a soldering point 423.

The elongated base 31 also comprises a slot (not shown) corresponding to the barb 421. By the clasping of the barb 421 and the inner wall of the slot, the fixed metal element 42 is fixed to the elongated base 31.

The stopper 422 is disposed at one end of the fixed metal element 42 and vertically extends upwards. The cross section of the soldering point 423 has an "L" profile and vertically extends downwards. The card edge connector 10 is soldered to the motherboard through the soldering point 423.

The movable metal element 43 is also disposed on the connection portion 32 and closely adjacent to the second surface 412 of the supporting beam 41. The movable metal element 43 is movable with the supporting beam 41. The movable metal element 43 comprises a fixed end 431, a free end 432, a fixed hook 433, an extension 434, a barb 435 and a second limit portion 436.

The fixed end 431 of the movable metal element 43 is inserted in the elongated base 31 by using the barb 435 clasping with a slot (not shown) corresponding to the barb 435. By the clasping of the barb 435 and the inner wall of the slot, the movable metal element 43 is fixed to the elongated base 31. The fixed hook 433 of the free end 432 hooks on the extrusive fixed element 414 of the supporting beam 41 so that the free end 432 of the movable metal element 43 is movable with the moving of the free end 418 of the supporting beam 41.

The extension 434 can be an L-shape piece. It inwardly extends along the first surface 411 and corresponds to the stopper 422. It also keeps a distance from the stopper 422. In other words, the stopper 422 is disposed on the moving track of the extension 434 of the movable element 43 and has a distance from the extension 434. The second limit portion 436 corresponds to the stopper 422. When the supporting beam 41 is not subject to an external force, the stopper 422 is against the second limit portion 436 to restrain the horizontal moving of the fixed metal element 42.

Figure 5A:
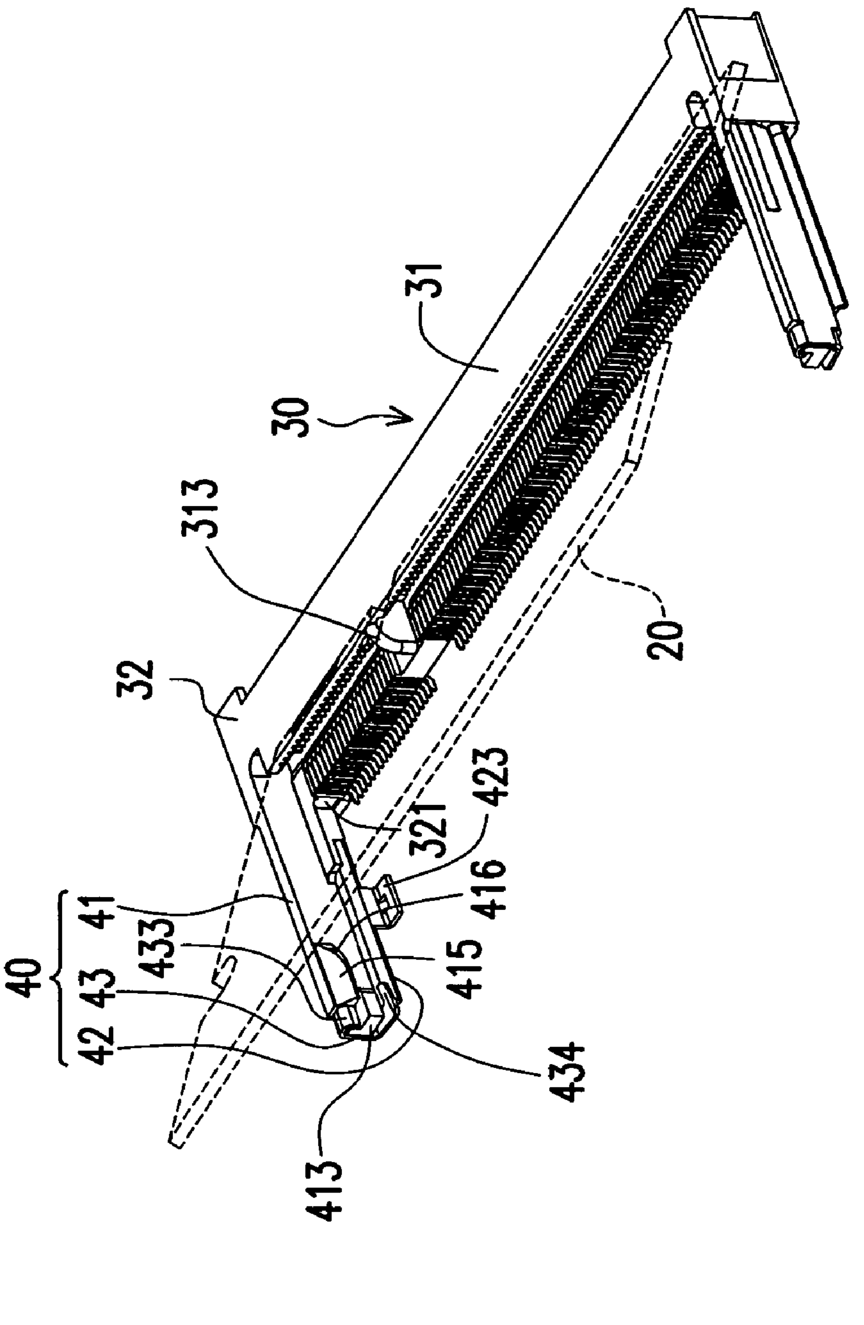
FIGS. 5A–5C are schematic drawings showing progress of inserting an electronic card into a card edge connector according to an embodiment of the present invention.
Figure 5B:
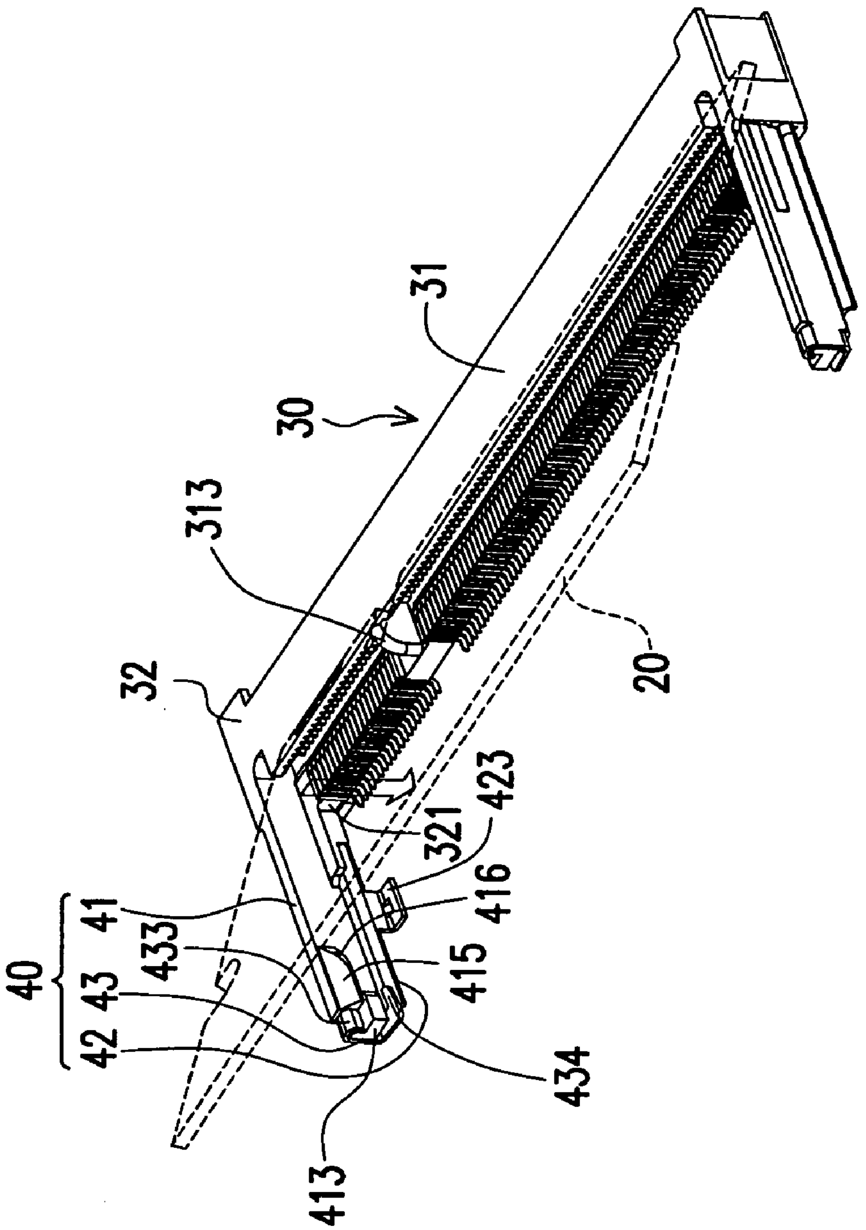
Figure 5C:
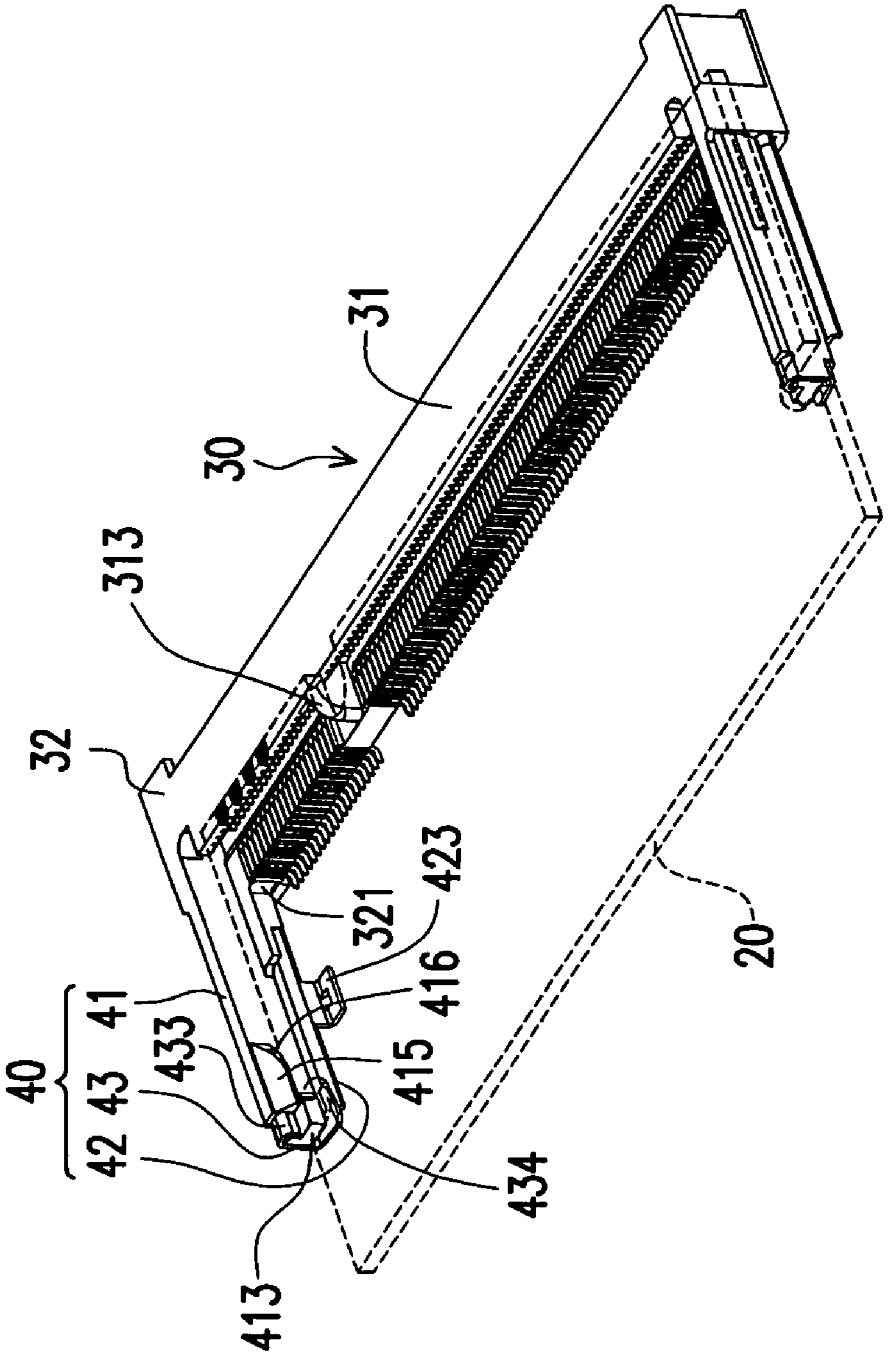

Referring to FIG. 5A, when the electronic card 20 is to be inserted into the card edge connector 10, the electronic card 20 is titled and one side of the electronic card 20 is inserted in the slot 311. Referring to FIG. 5B, a downward force is applied on another side of the electronic card 20 so that the two side edges of the electronic card 20 move downwards along the slope surface 415 of the supporting beam 41 and the latch assemblies 40 at two ends of the elongated base 31 are stretched outwardly. Referring to FIG. 5C, the lock portions 413 of the supporting beam 41 lock on the locking slots 23 of the electronic card 20 respectively so that the electronic card 20 is horizontally fixed. Since the first limit portion 416 of the supporting beam 41 accommodates the top surface of the electronic card 20, the electronic card 20 is vertically fixed. Accordingly, the electronic card 20 is firmly fixed on the card edge connector 10.

Reversely, if the electronic card 20 is to be disassembled from the card edge connector 10, an external force can be applied to stretch these two supporting beams 41 outwardly that the lock portions 413 will be disconnected from the locking slots 23. Due to the conductive terminals 312, posture of the electronic card 20 returns to the pre-set angle, and the electronic card 20 is removed from the slot 311. As a result, the electronic card 20 is disassembled from the card edge connector 10.

Note that regardless whether the electronic card 20 is assembled onto or disassembled from the card edge connector 10, when the supporting beams 41 are subject to an external force and stretched outwardly, the movable metal elements 43 follows the movement of the supporting beams 41. The extensions 434 of the movable metal elements 43 also move toward the stoppers 422 of the fixed metal elements 42. The stoppers 422 of the fixed metal elements 42 restrain the moving of the extensions 434 so as to prevent the over-moving of the free ends 418 of the supporting beams 41. Accordingly, the bending of the supporting beams 41 also is restrained.

Although the present invention has been described in terms of exemplary embodiments, it is not limited thereto. Rather, the appended claims should be constructed broadly to include other variants and embodiments of the invention, which may be made by those skilled in the field of this art without departing from the scope and range of equivalents of the invention.

What is claimed is:

1. A card edge connector for electrically connecting an electronic card with a motherboard, the card edge connector comprising:

- an insulating housing, comprising an elongated base and a pair of connection portions disposed along two sides of the elongated base; the elongated base comprising a slot along a longitudinal direction of the elongated base;
- a plurality of conductive terminals, disposed over the elongated base and extending into the slot so as to connect with the electronic card inserted in the slot; and
- a pair of latch assemblies, individually disposed to the pair of connection portions to fix to the electronic card, each of the latch assemblies comprising:
  - a supporting beam, the supporting beam fixed end constituting the connection portion corresponding thereto, the supporting beam free end extending outwardly along a side of the elongated base; the supporting beam comprising a first limit portion and a lock portion, wherein the first limit portion accommodates a top surface of the electronic card, and the lock portion accommodates a side surface of the electronic card;
  - a fixed metal element, disposed on a side of the supporting beam and comprising a stopper; and
  - a movable metal element, disposed on another side of the supporting beam and comprising an extension corresponding to the stopper, the moveable metal element following a moving of the free end of the supporting beam;
- when the supporting beams are stretched outwardly by external force, the stopper restricting a moving distance of the extension.

2. The card edge connector of claim 1, wherein the slot comprises an extrusive key therein, the extrusive key corresponding to an intrusive key slot of the electronic card, the intrusive key slot accommodates the extrusive key to prevent a false insertion of the electronic card.

3. The card edge connector of claim 1, wherein a location of the connection portion, which is adjacent to the supporting beam, comprises a strengthening portion, the strengthening portion extending to an outer side adjacent to the fixed end of the supporting beam to enhance structure strength of the supporting beam.

4. The card edge connector of claim 1, wherein the supporting beam comprises a fixed element, the movable metal element comprises a fixing hook, and the fixing hook hooks on the fixed element so that the movable metal element is movable with the supporting beam.

5. The card edge connector of claim 1, wherein the supporting beam comprises a fixed clement, the movable metal element comprises a fixing hook, and the fixing hook hooks on the fixed element so that the free end of the movable metal element is movable with the supporting beam.

6. The card edge connector of claim 1, wherein the fixed metal element comprises a soldering point to be soldered on the motherboard.

7. The card edge connector of claim 1, wherein the fixed metal element comprises a barb, and the connection portion comprises a slot corresponding to the barb so that the barb is inserted in the slot and the fixed metal element is fixed to the connection portion.

8. The card edge connector of claim 1, wherein the movable metal element comprises a barb, and the connection portion comprises a slot corresponding to the barb so that the barb is inserted in the slot and the movable metal element is fixed to the connection portion.

9. The card edge connector of claim 1, wherein the movable metal element comprises a second limit portion, and when the supporting beam is not subject to an external force, the stopper is attached to the second limit portion.

* * * * *